(12) United States Patent
Knezevic et al.

(10) Patent No.: US 9,979,543 B2
(45) Date of Patent: May 22, 2018

(54) OPTIMIZED HARDWARE ARCHITECTURE AND METHOD FOR ECC POINT DOUBLING USING JACOBIAN COORDINATES OVER SHORT WEIERSTRASS CURVES

(71) Applicant: NXP B.V., Eindhoven (NL)

(72) Inventors: Miroslav Knezevic, Leuven (BE); Ventzislav Nikov, Heverlee (BE)

(73) Assignee: NXP B.V., Eindhoven (NL)

( * ) Notice: Subject to any disclaimer, the term of this patent is extended or adjusted under 35 U.S.C. 154(b) by 188 days.

(21) Appl. No.: 14/139,849

(22) Filed: Dec. 23, 2013

(65) Prior Publication Data

US 2015/0178503 A1   Jun. 25, 2015

(51) Int. Cl.
*H04L 9/00* (2006.01)
*H04L 9/30* (2006.01)
*G06F 7/72* (2006.01)

(52) U.S. Cl.
CPC ............ *H04L 9/3066* (2013.01); *G06F 7/725* (2013.01); *G06F 7/726* (2013.01)

(58) Field of Classification Search
CPC ..... H04L 9/3066; H04L 9/003; H04L 9/3013; G06F 7/725; G06F 7/726
USPC .......................................................... 380/28
See application file for complete search history.

(56) References Cited

U.S. PATENT DOCUMENTS

| | | | | |
|---|---|---|---|---|
| 6,112,218 A | * | 8/2000 | Gandhi | ................. H03H 17/04 708/320 |
| 6,366,940 B1 | * | 4/2002 | Ono | ........................ G06F 7/722 708/491 |
| 6,567,832 B1 | | 5/2003 | Ono | |
| 6,738,478 B1 | | 5/2004 | Vanstone et al. | |
| 7,508,936 B2 | | 3/2009 | Eberle et al. | |
| 7,702,105 B1 | * | 4/2010 | Gura | ........................ G06F 7/726 380/255 |
| 8,112,626 B1 | | 2/2012 | Adler | |
| 8,582,758 B2 | | 11/2013 | Joye | |
| 2001/0033655 A1 | | 10/2001 | Vadekar et al. | |
| 2003/0068037 A1 | * | 4/2003 | Bertoni | ................... G06F 7/724 380/30 |
| 2003/0206629 A1 | * | 11/2003 | Eberle | ..................... G06F 7/724 380/30 |
| 2004/0158597 A1 | | 8/2004 | Ye et al. | |
| 2007/0198824 A1 | | 8/2007 | Chen et al. | |

(Continued)

FOREIGN PATENT DOCUMENTS

| | | | |
|---|---|---|---|
| CN | 101782845 A | 7/2010 | |
| CN | 102109974 A | 6/2011 | |

(Continued)

OTHER PUBLICATIONS

EP Communication—European Search Report in EP 14198456.7 dated Apr. 7, 2015.

(Continued)

*Primary Examiner* — Hadi Armouche
*Assistant Examiner* — Bryan Wright

(57) ABSTRACT

An optimized hardware architecture and method introducing a simple arithmetic processor that allows efficient implementation of an Elliptical Curve Cryptography point doubling algorithm for Jacobian coordinates. The optimized architecture additionally reduces the required storage for intermediate values to one intermediate value.

8 Claims, 6 Drawing Sheets

(56) References Cited

U.S. PATENT DOCUMENTS

| | | | |
|---|---|---|---|
| 2009/0300087 A1* | 12/2009 | Tajiri | G06F 7/49947 708/205 |
| 2009/0319804 A1 | 12/2009 | Qi et al. | |
| 2010/0011047 A1 | 1/2010 | Jackson et al. | |
| 2010/0040225 A1* | 2/2010 | Venelli et al. | 380/28 |
| 2010/0150340 A1* | 6/2010 | Choi | G06F 7/725 380/28 |
| 2011/0075836 A1 | 3/2011 | Yamamoto et al. | |
| 2014/0016772 A1 | 1/2014 | Yajima et al. | |

FOREIGN PATENT DOCUMENTS

| | | |
|---|---|---|
| CN | 102279725 A | 12/2011 |
| CN | 102297725 A | 12/2011 |
| CN | 102393812 A | 3/2012 |
| JP | 2007-286380 A | 11/2007 |
| JP | 4621162 B2 | 1/2011 |

OTHER PUBLICATIONS

Anonymous, EFD/Genus-1 large-characteristiclJacobian coordinates with a4=-3 for short Weierstrass curves Dec. 3, 2013, retrieved from the internet: URL:http://web.archive.org/web/20131203080425/http://hyptereIliptic.org/EFD/g1p/auto-shortw-jacobian-3.html [retrieved Mar. 25, 2015].

Baktir, et al., A state-of-the-art Elliptic Curve Cryptographic Processor Operating in the Frequency Domain, Mobile Networks an Applcations (Monet) Journal, vol. 12, No. 4, Sep. 30, 2007, Kluwer Academic Publishers, Boston.

Bernstein, A Software Implementation of NIST P-224, retrieved from the internet: Oct. 29, 2001, URL:http:/cr.yp.to/talks/2001.10.29/slides.ps/2001.10/29/slide [retrieved Mar. 25, 2015].

Izu, et al., Fast Elliptic Curve Multiplications with SIMD Operations, IEICE Transactions on Fundamentals of Electronics, Communications and Computer Sciences, Engineering Sciencies Society, vol. E87-A, No. 1, pp. 85-93.

Cohen, H. et al. "Efficient Elliptic Curve Exponentiation Using Mixed Coordinates", International Conference on the Theory and Application of Cryptology and Information Security: Advances in Cryptology, pp. 51-65 (Oct. 18, 1998).

Extended European Search Report for Patent Appln. No. 14198913.7 (Jun. 25, 2015).

Johnson, D. et al. "The Elliptic Curve Digital Signature Algorithm (ECDSA)", Certicom Corporation, 56 pgs, retrieved from the internet at: http://cs.ucsb.edu/~koc/ccs130h/notes/ecdsa-cert.pdf (2001).

Bednara, M. et al. "Tradeoff Analysis of FPGA Based Elliptic Curve Cryptography", IEEE International Symposium on Circuits and Systems, pp. 797-800 (Aug. 7, 2002).

Lochter, M. et al. "Elliptic Curve Cryptograhy (ECC) Brainpool Standard Curves and Curve Generation", 28 pgs, retrieved from the internet at: https://tools.ietf.org/html/rfc5639 (Mar. 2010).

Miller, V. S "Use of Elliptic Curves in Cryptography", Conference on the Theory and Application of Cryptographic Techniques, pp. 417-426 (1985).

Koblitz, N. et al. "Elliptic Curve Cryptosystems", Mathematics of Computation, vol. 48, No. 177, pp. 203-209 (Jan. 1987).

"FIPS Pub 186-3 — Federal Information Processing Standards Publication — Digital Signature Standard (DSS)", National Institute of Standards and Technology, 131 pgs, retrieved from the internet at: http://csrc.nist.gov/publications/fips/fips186-3/fips_186-3.pdf (Jun. 2009).

"Sec 2: Recommended Elliptic Curve Domain Parameters — Version 1.0", Standards for Efficient Cryptography, Certicom Corporation, 51 pgs, retrieved from the internet at: http://www.secg.org/SEC2-Ver-1.0.pdf (Sep. 20, 2000).

Hankerson, D. et al. "Guide to Elliptic Curve Cryptography", Springer, 332 pgs (2004).

Hankerson, D. et al. "Elliptic Curve Arithmetic — Guide to Elliptic Curve Cryptography", Springer, pp. 75-113 (Jan. 1, 2004).

Batina, L. et al. "Hardware architectures for public key cryptography", Integration, the VLSI journal 34, pp. 1-64 (2003).

Guneysu, T. et al. "Ultra High Performance ECC over Nist Primes on Commercial FPGAs", International Workshop on Cryptographic Hardward and Embedded Systems, pp. 62-78 (2008).

Vinay, T. et al. "Fpga Impementation of Elliptical Curve Cryptography Using Mixed Coordinates", International Journal of VLSI and Embedded Systems-IJVES, vol. 4, Article 06104, pp. 438-443 (Jun. 2013).

Extended European Search Report for Patent Appln. No. 14198280.1 (Jul. 28, 2015).

Office Action from counterpart CN Appln. No. 201410806141.2 (Mar. 1, 2017).

Office Action from related CN Appln. No. 201410799942.0 (Jul. 3, 2017).

Szerwinski, R. "Efficient Cryptography on Graphics Hardware", 133 pgs, Diploma Thesis, Dept. of Electrical Engineering & Information Sciences, Ruhr-Univ. Bochum, retrieved from the internet at: https://www.emsec.rub.de/media/crypto/attachments/files/2010/04/da_szerwinski.pdf (Feb. 15, 2008).

Communication pursuant to Article 94(3) EPC for the related patent application 14198913.7 (Apr. 3, 2017).

Feng, W. "Refinement of algorithm for computing Tate parings of "RFC5091"", Journal of Fujian University of Technology, vol. 9, No. 1, 4 pgs. (Feb. 2011).

Office Action for Related Counterpart CN Application No. 201410787996.5 (Nov. 15, 2017).

Notice of Allowance for Related U.S. Appl. No. 14/139,831 (Oct. 10, 2017).

* cited by examiner

INPUT: $P = (X_1 : Y_1 : Z_1)$ IN JACOBIAN COORDINATES,
ON E/K: $y = x^3 - 3x + b$ CURVE.
OUTPUT: $2P = (X_3 : Y_3 : Z_3)$ IN JACOBIAN
COORDINATES.
1: if $P = \infty$ then return $\infty$.
2: $\delta = Z_1^2$
3: $\gamma = Y_1^2$
4: $\beta = X_1 * \gamma$
5: $\alpha = 3(X_1 - \delta) * (X_1 + \delta)$
6: $X_3 = \alpha^2 - 8\beta$
7: $Z_3 = (Y_1 + Z_1)^2 - \gamma - \delta$
8: $Y_3 = \alpha * (4\beta - X_3) - 8\gamma^2$
9: return $(X_3 : Y_3 : Z_3)$.

OPTIMIZED HARDWARE ARCHITECTURE AND METHOD FOR ECC POINT DOUBLING USING JACOBIAN COORDINATES OVER SHORT WEIERSTRASS CURVES

BACKGROUND

Electronic devices are becoming a ubiquitous part of everyday life. The number of smartphones and personal tablet computers in use is rapidly growing. A side effect of the increasing use of smartphones and personal tablets is that increasingly the device are used for storing confidential data such as personal and banking data. Protection of this data against theft is of paramount importance.

The field of cryptography offers protection tools for keeping this confidential data safe. Based on hard to solve mathematical problems, cryptography typically requires highly computationally intensive calculations that are the main barrier to wider application in cloud and ubiquitous computing (ubicomp). If cryptographic operations cannot be performed quickly enough, cryptography tools are typically not accepted for use on the Internet. In order to be transparent while still providing security and data integrity, cryptographic tools need to follow trends driven by the need for high speed and the low power consumption needed in mobile applications.

Public key algorithms are typically the most computationally intensive calculations in cryptography. For example, take the case of Elliptic Curve Cryptography (ECC), one of the most computationally efficient public key algorithms. The 256 bit version of ECC provides security that is equivalent to a 128 bit symmetric key. A 256 bit ECC public key should provide comparable security to a 3072 bit RSA public key. The fundamental operation of ECC is a point multiplication which is an operation heavily based on modular multiplication, i.e. approximately 3500 modular multiplications of 256 bit integers are needed for performing one ECC 256 point multiplication. Higher security levels (larger bit integers) require even more computational effort.

Building an efficient implementation of ECC is typically non-trivial involves multiple stages. FIG. 1 illustrates stages 101, 102 and 103 that are needed to realize the Elliptical Curve Digital Signature Algorithm (ECDSA), which is one of the applications of ECC. Stage 101 deals with finite field arithmetic that comprises modular addition, inversion and multiplication. Stage 102 deals with point addition and point doubling which comprises the Joint Sparse Form (JSF), Non-Adjacent Form (NAF), windowing and projective coordinates. Finally, stage 103 deals with the ECDSA and the acceptance or rejection of the digital signature.

Any elliptic curve can be written as a plane geometric curve defined by the equation of the form (assuming the characteristic of the coefficient field is not equal to 2 or 3):

$$y^2 = x^3 + ax + b \qquad (1)$$

that is non-singular; that is it has no cusps or self-intersections and is known as the short Weierstrass form where a and b are integers. The case where $a=-3$ is typically used in several standards such as those published by NIST, SEC and ANSI which makes this the case of typical interest.

Many algorithms have been proposed in the literature for efficient implementation of the Point Addition (PADD) and Point Doubling (PDBL) operations. Many of these algorithms are optimized for software implementation. While these are typically efficient on certain platforms, the algorithms are typically not optimal once the underlying hardware can be tailored to the algorithm.

A PDBL algorithm for Jacobian coordinates has been described by Cohen, Miyaji and Ono in Proceedings of the International Conference on the Theory and Applications of Cryptography and Information Security; Advances in Cryptology, ASIACRYPT 1998, pages 51-65, Springer-Verlag, 1998. Jacobian coordinates are projective coordinates where each point is represented as three coordinates (X, Y, Z). Note the coordinates are all integers. PDBL algorithm 200 requires 4 modular multiplications, 4 modular squarings, 4 modular subtractions, one modular addition, one modular multiplication by 2 and one modular division by 2 and is shown in FIG. 2. In order to perform the PDBL, the algorithm further requires a minimum of 3 temporary registers, which for ECC 256 bit each need to be 256 bits in size. All operations are done in the finite field K over which the elliptic curve E is defined. The finite arithmetic field K is defined over the prime number p so that all arithmetic operations are performed modulo p. The identity element is the point at infinity.

SUMMARY

An optimized hardware architecture and method reduces storage requirements and speeds up the execution of the ECC PDBL algorithm by requiring only two temporary storage registers and by introducing a simple arithmetic unit for performing modular addition, subtraction and multiplication and division by 2.

BRIEF DESCRIPTION OF THE DRAWINGS

FIG. 2 shows a prior art point doubling algorithm.

DETAILED DESCRIPTION

Figure 1:
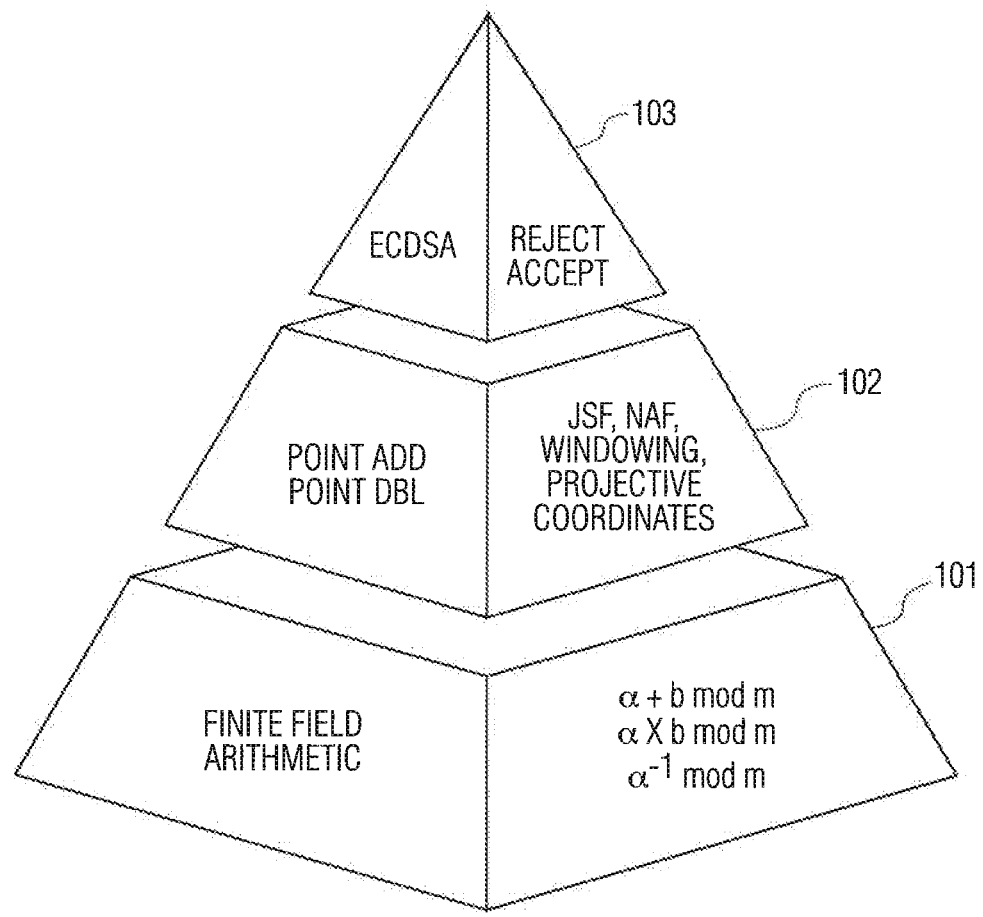
FIG. 1 shows stages 101, 102 and 103 that are needed to realize the Elliptical Curve Digital Signature Algorithm (ECDSA).
Figure 3:
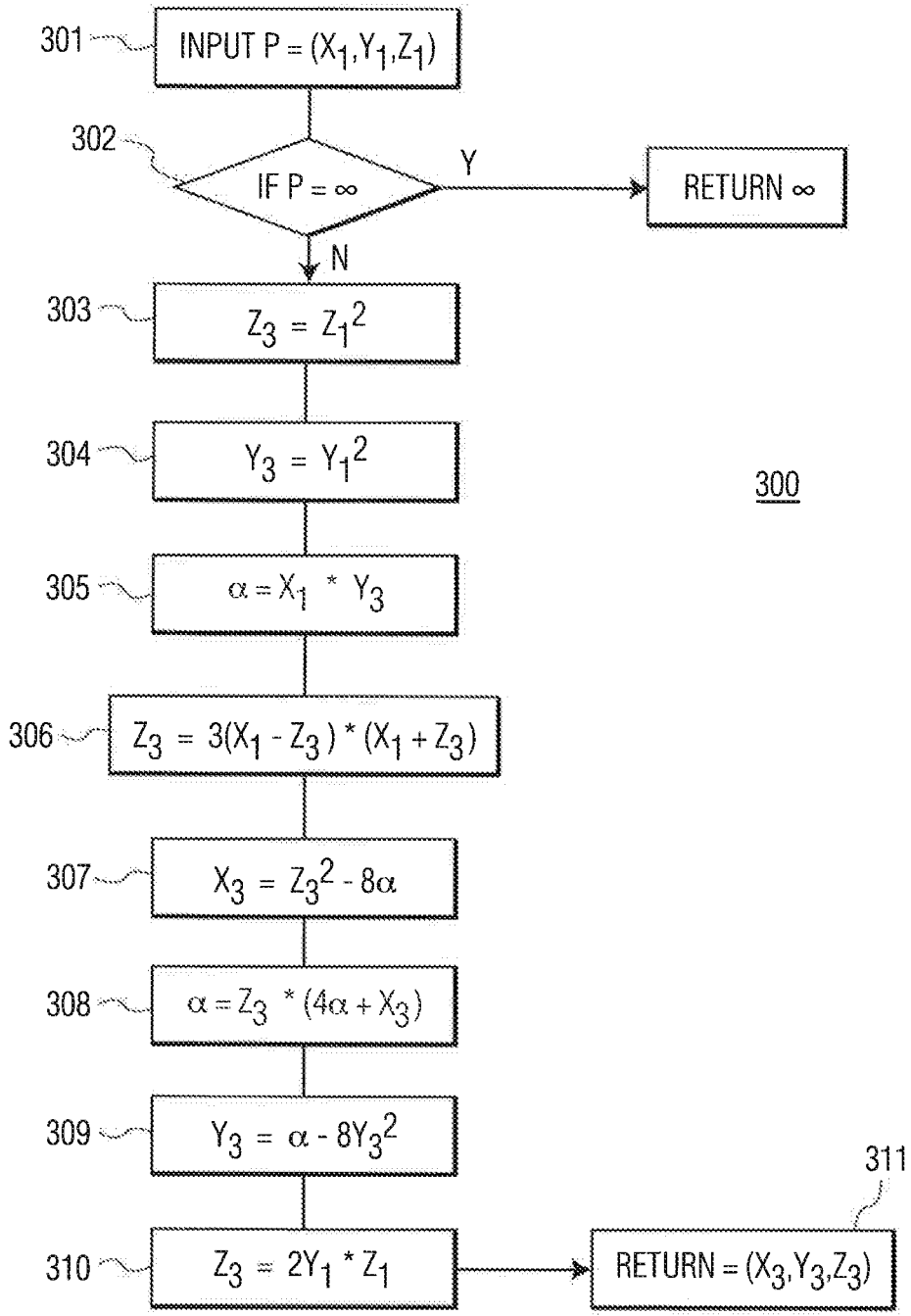
FIG. 3 shows an embodiment in accordance with the invention.

PDBL algorithm 300 in accordance with the invention is shown in FIG. 3. PDBL algorithm 300 requires fewer steps and reduces the storage requirements compared to PDBL algorithm 200 for the same modular point doubling. PDBL algorithm 300 requires only two temporary storage registers, $T_1$ and $T_2$. PDBL algorithm 300 is implemented over an optimized hardware architecture shown in FIG. 6 and FIG. 7 which is specifically designed to take advantage of PDBL algorithm 300.

As input in step 301, PDBL algorithm 300 shown in FIG. 3 takes point $P=(X_1, Y_1, Z_1)$ in Jacobian coordinates. $\alpha$ is the temporary storage variable. Note that all mathematical operations shown are in modular arithmetic and the coordinates are Jacobian. In step 302 of PDBL algorithm 300, if $P=\infty$ (the identity element) the value co is returned. In step 303, $Z_1$ is squared ($Z_1 * Z_1$) with the resulting value stored in $Z_3$. In step 304, $Y_1$ is squared ($Y_1 * Y_1$) and the resulting value stored in $Y_3$. In step 305, $X_1 * Y_3$ is calculated and the result stored in temporary register $\alpha$. In step 306, $3(X_1 - Z_3)$

*($X_1+Z_3$) is calculated and the result stored in $Z_3$. In step 307, $Z_3*Z_3-8\alpha$ is calculated with the result stored in $X_3$. In step 308, $Z_3*(4\alpha-X_3)$ is calculated and the result stored in temporary register $\alpha$. In step 309, $\alpha-8Y_1*Y_1$ is calculated and the result stored in $Y_3$. In step 310, $2Y_1*Z_1$ is calculated and the result is stored in $Z_3$. Finally, in step 311 the result of the point doubling of P is returned in Jacobian coordinates as ($X_3$, $Y_3$, $Z_3$).

The most computationally intensive operation in PDBL algorithm 300 in FIG. 3 is modular multiplication denoted by "*". Because most of the steps described in PDBL algorithm 300 depend on the previous steps of the algorithm, it is typically most efficient to implement PDBL algorithm 300 in hardware using a single modular multiplier although more than one modular multiplier may be used in accordance with the invention which allows more than one modular multiplication to be performed in a step. Using only one modular multiplier restricts each step in PDBL algorithm 300 to having no more than one modular multiplication.

Figure 4:
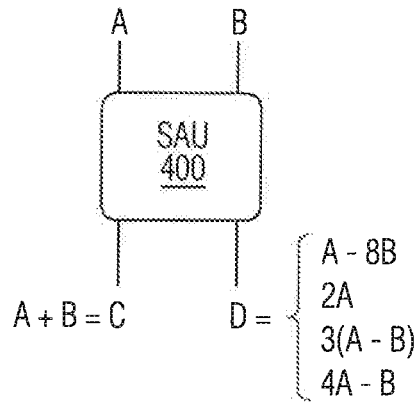
FIG. 4 shows an embodiment in accordance with the invention.

It is important to note that besides the modular multiplication steps performed in steps 303, 304, 305, 306, 307, 308, 309 and 310 of PDBL algorithm 300, additional, comparatively simple operations are performed as well: modular subtraction and addition and modular multiplication by powers of 2. Note that multiplication by a power of 2 in binary is merely a left shift operation. In order to speed up execution of PDBL algorithm 300 and eliminate the need for additional temporary registers, an embodiment in accordance with the invention of simple arithmetic unit (SAU) 400 with the inputs A, B and outputs C and D as shown in FIG. 4 is used.

Figure 5:
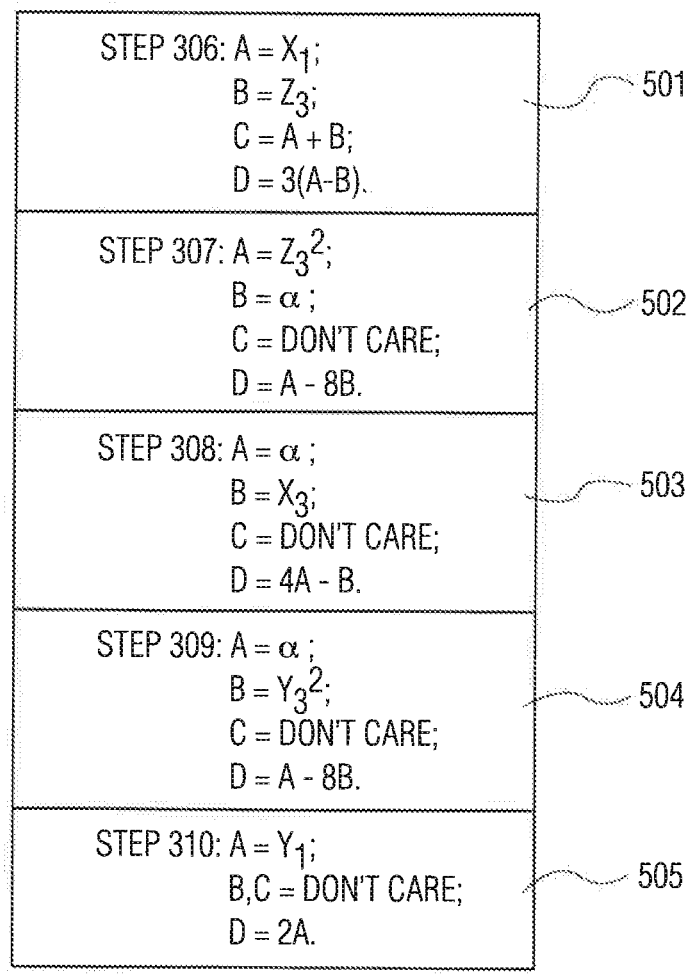
FIG. 5 shows an embodiment in accordance with the invention.

FIG. 5 shows how steps 306, 307, 308, 309 and 310 are broken down for utilization of SAU 400 which has inputs A and B with outputs C and D. Note that the input and output labels of SAU 400 correspond to the respective variable names in FIG. 5. Block 501 shows how step 306 of PDBL algorithm 300 is broken down using SAU 400 and involves setting inputs A=$X_1$ and B=$Z_3$ with outputs C=A+B and D=3(A−B). Outputs c and D are then multiplied together and the result stored in $Z_3$. Block 502 shows how step 307 of PDBL algorithm 300 is broken down using SAU 400 and involves setting inputs A=$Z_3^2$ and B=$\alpha$ with output D=A−8B. Block 503 shows how step 308 of PDBL algorithm 300 is broken down using SAU 400 and involves setting inputs A=$\alpha$, B=$X_3$ with output D=4A−B. Output D is then multiplied by $Z_3$ and the result stored in temporary storage register $\alpha$. Block 504 shows how step 309 of PDBL algorithm 300 is broken down using SAU 400 and involves setting inputs A=$\alpha$ and B=$Y_3^2$ with output D=A−8B. Block 505 shows how step 310 of PDBL algorithm 300 is broken down using SAU 400 and involves setting input A=$Y_1$ and output D=2A. Output D is then multiplied by $Z_1$ and the result is stored in $Z_3$.

Figure 6:
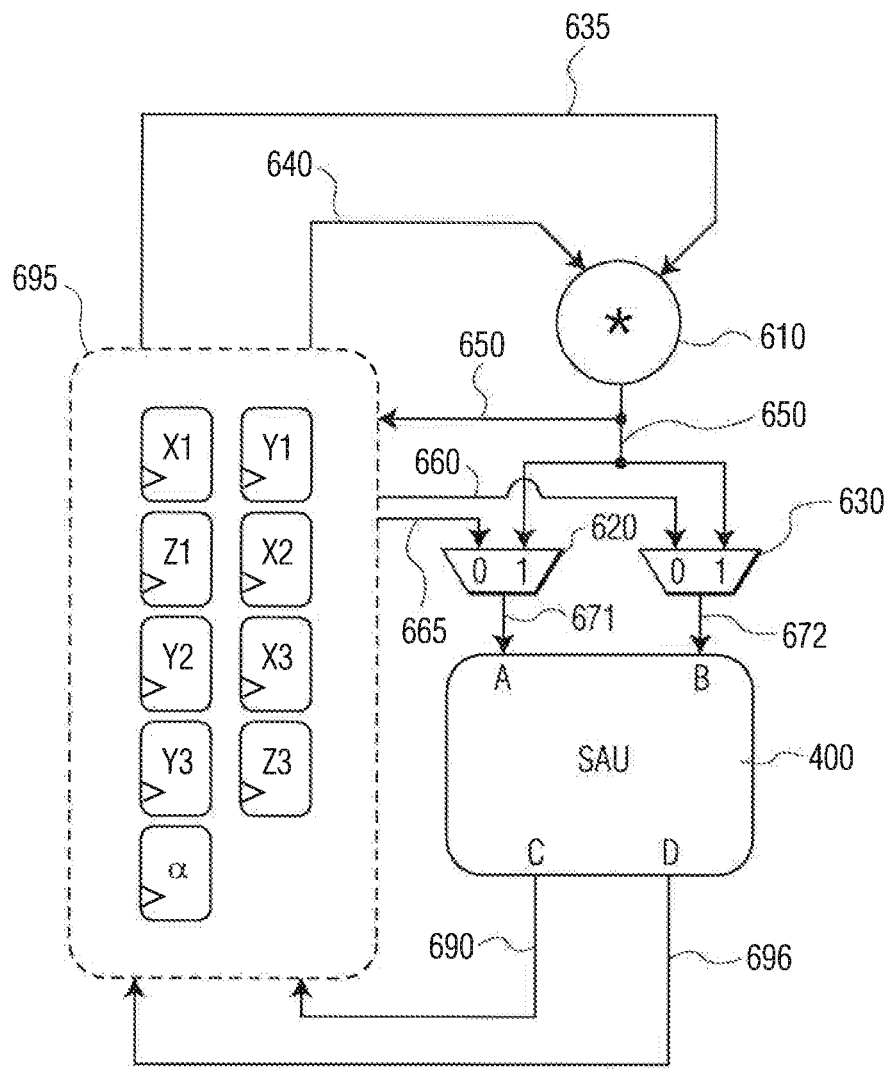
FIG. 6 shows an embodiment in accordance with the invention.

FIG. 6 shows embodiment 600 in accordance with the invention comprising multi-cycle multiplier 610 with output register (not shown), SAU 400, multiplexer (MUX) 620 and MUX 630 with input registers $X_1$, $Y_1$, $Z_1$, $x_2$, $y_2$ (not used), output registers $X_3$, $Y_3$, $Z_3$ and temporary register $\alpha$ that are all part of register memory 695. Note the individual register labels correspond to variable names in FIGS. 3 and 5. Multiplexer (MUX) 620, MUX 630 and MUXs 720. 722 and 725 (part of SAU 400, see FIG. 7) are controlled by the microprocessor (not shown) which executes PDBL algorithm 300. As noted above, each step in PDBL algorithm 300 involve at most one modular multiplication (not counting multiplications by a power of 2 which in binary representation is merely a shift operation).

Figure 7:
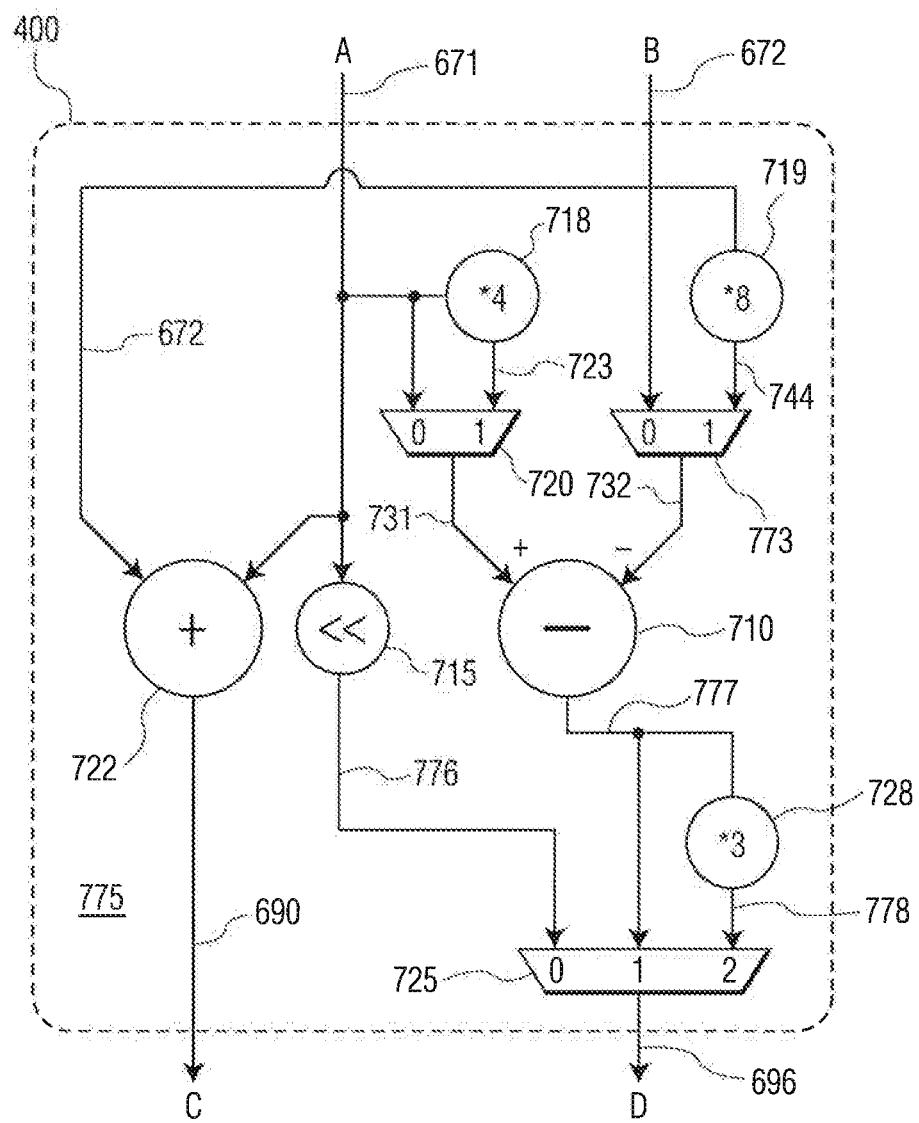
FIG. 7 shows an embodiment in accordance with the invention.

SAU 400 shown in FIG. 7 comprises subtractor 710, adder 722, logical one bit left shifter 715, logical two bit left shifter 718 (multiplication by 4), logical three bit left shifter 714 (multiplication by 8), MUX 720, MUX 723, MUX 725 and multiplier by three 728 which is constructed using a logical one bit left shifter and an adder (2x+x=3x).

Input A connects to adder 722 on line 671 and also connects to one bit left shifter 715, to input "0" of MUX 720 and to logical two bit left shifter 718 on line 671. Logical one bit shifter 715 outputs 2A on line 776 to input "0" of MUX 725. Logical two bit left shifter 718 outputs 4A on line 733 to input "1" of MUX 720. MUX 720 connects to the minuend input of subtractor 710 on line 731. Input B connects to adder 722 on line 672 and also connects to logical three bit left shifter 714 and input "0" of MUX 723 on line 672. Logical three bit left shifter 714 outputs 8B to input "1" of MUX 723 on line 744. MUX 723 connects to the subtrahend input of subtractor 710 on line 732. Adder 722 outputs C (=A+B) on line 690. Subtractor 710 connects to input "1" of MUX 725 on line 777 and connects to multiplier by three 728 on line 777. Multiplier by three 728 connects to input "2" on MUX 725. MUX 725 outputs D (see FIG. 4) on line 696.

Multi-cycle multiplier 610 functions by multiplying the values on lines 635 and 640 together and outputting the result. Steps 301-302 are performed using the microprocessor (not shown) without using multi-cycle multiplier 610 and SAU 400.

Step 303 utilizes multi-cycle multiplier 610. Register memory 695 provides $Z_1$ on both inputs 635 and 640 of multi-cycle multiplier 610 and multi-cycle multiplier 610 computes $Z_1^2$ which is sent on line to register memory 695 where it is stored in $Z_3$.

Step 304 utilizes multi-cycle multiplier 610. Register memory 695 provides $Y_1$ on both line 635 and on line 640 to multi-cycle multiplier 610. Multi-cycle multiplier 610 computes $Y_1*Y_1$ which is sent on line 650 to register memory 695 where it is stored in $Y_3$.

Step 305 utilizes multi-cycle multiplier 610. Register memory 695 provides $X_1$ on line 635 and $Y_3$ on line 640 to multi-cycle multiplier 610. Multi-cycle multiplier 610 computes $X_1*Y_3$ which is sent on line 650 to register memory 695 where it is stored in temporary register $\alpha$.

Step 306 utilizes both multi-cycle multiplier 610 and SAU 400. Register memory 695 provides $X_1$ on line 665 to input "0" of MUX 620 with MUX 620 set to "0". MUX 620 sends $X_1$ to input A of SAU 400 on line 671 directly to adder 722 and to input "0" of MUX 720 with MUX 720 set to "0". MUX 720 sends A ($X_1$) to the minuend input of subtractor 710 on line 731. Register memory 695 provides $Z_3$ on line 650 to input "0" of MUX 630 with MUX 630 set to "0". MUX 630 sends $Z_3$ to input B of SAU 400 on line 672 directly to adder 722 and input "0" of MUX 723 with MUX 723 set to "0". MUX 723 sends B ($Z_3$) to the subtrahend input of subtractor 710. Subtractor 710 computes A−B (which is $X_1-Z_3$) which is output online 777 to multiplier by three 728 which computes and outputs 3(A−B) (which is 3($X_1-Z_3$)) on line 778 to input "2" of MUX 725. MUX 725 sends D (which is 3(A−B)=3($X_1-Z_3$)) on line 696 to register memory 695 which passes D on line 635 to multi-cycle multiplier 610. Adder 722 computes A+B and outputs the result as C (which is ($X_1+Z_3$)) on line 690 to register memory 695 which passes C on line 640 to multi-cycle multiplier 610. Multi-cycle multiplier computes C*D (which is $3(X_1-Z_3)*(X_1+Z_3))$ which is output on line 650 to register memory 695 where the result is stored in $Z_3$.

Step 307 utilizes both multi-cycle multiplier 610 and SAU 400. Register memory 695 provides $Z_3$ on both lines 635 and 640 to multi-cycle multiplier 610. Multi-cycle multiplier 610 computes and outputs $Z_3*Z_3$ on line 650 to input "1" of MUX 620 with MUX 620 set to "1". MUX 620 sends $Z_3^2$ to input A of SAU 400 on line 671 which connects to input "0" on MUX 720 with MUX. MUX 720 sends A ($Z_3^2$) on line 731 to the minuend input of subtractor 710. Register memory 695 provides a on line 660 to input "0" of MUX 630 with MUX 630 set to "0". MUX 630 sends α to input B of SAU 400 on line 672 which connects to logical three bit left shifter 714 (multiply by 8). Logical three bit left shifter 714 computes and outputs 8B (8α) on line 744 to input "1" of MUX 723 with MUX 723 set to "1". MUX 723 sends 8B on line 732 to the subtrahend input of subtractor 710. Subtractor computes and outputs A−8B (which is $Z_3$−8α) on line 777 to input "1" of MUX 725 with MUX 725 set to "1". MUX 725 sends D (which is A−8B=$Z_3$−8α) on line 696 to register memory 695 where the result is stored in $X_3$.

Step 308 utilizes both multi-cycle multiplier 610 and SAU 400. Register memory 695 provides a on line 665 to input "0" of MUX 620 with MUX 620 set to "0". MUX 620 sends α to input A of SAU 400 on line 671 which connects to logical two bit left shifter 718 (multiply by 4). Logical two bit left shifter 718 computes and outputs 4A (4α) on line 733 to input "1" of MUX 720 with MUX 720 set to "1". MUX 720 sends 4A on line 731 to the minuend input of subtractor 710. Register memory 695 provides $X_3$ on line 660 to input "0" of MUX 630 with MUX 630 set to "0". MUX 630 sends $X_3$ to input B of SAU 400 on line 672 which is connected to input "0" of MUX 723 with MUX 723 set to "0". MUX 723 sends B ($X_3$) on line 732 to the subtrahend input of subtractor 710. Subtractor 710 computes and outputs 4A−B (which is 4α−$X_3$) on line 777 to input "1" of MUX 725 with MUX 725 set to "1". MUX 725 outputs D (which is 4A−B=4α−$X_3$) on line 696 to register memory 695 which passes D onto line 635 and provides $Z_3$ on line 640 to multi-cycle multiplier 610 which computes and outputs $Z_3*D$ (which is $Z_3*(4\alpha-X_3)$) on line 650 to register memory 695 where the result is stored in temporary register α.

Step 309 utilizes both multi-cycle multiplier 610 and SAU 400. Register memory 695 provides a on line 665 to input "0" of MUX 620 with MUX 620 set to "0". MUX 620 sends α to input A of SAU 400 on line 671 which connects to input "0" of MUX 720 with MUX 720 set to "0". MUX 720 sends A (α) on line 731 to the minuend input of subtractor 710. Register memory 695 provides $Y_3$ on both line 635 and line 640 to multi-cycle multiplier 610 which computes and outputs $Y_3*Y_3$ on line 650 which connects to input "1" of MUX 630 with MUX 60 set to "1". MUX 630 outputs $Y_3^2$ to input B of SAU 400 on line 672 which connects to logical three bit left shifter 719 (multiply by 8). Logical three bit left shifter 719 computes and outputs 8B ($8Y_3^2$) on line 744 to input "1" of MUX 723 with MUX 723 set to "1". MUX 723 sends 8B to the subtrahend input of subtractor 710. Subtractor 710 computes and outputs A−8B (which is $\alpha-8Y_3^2$) on line 777 to input "1" of MUX 725. MUX 725 sends D (which is A−8B=$\alpha-8Y_3^2$) on line 696 to register memory 695 where the result is stored in $Y_3$.

Step 310 utilizes both multi-cycle multiplier 610 and SAU 400. Register memory 695 provides $Y_1$ on line 665 to input "0" of MUX 620 with MUX 620 set to "0". MUX 620 sends $Y_1$ to input A of SAU 400 on line 671 which connects to logical one bit left shifter 715 (multiply by 2). Logical one bit left shifter 715 computes and outputs 2A ($2Y_1$) on line 776 to input "0" of MUX 725 with MUX 725 set to "0". MUX 725 sends D (which is $2A=2Y_1$) on line 696 to register memory 695 which passes D onto line 635 and provides $Z_1$ on line 640 to multi-cycle multiplier 610. Multi-cycle multiplier 610 computes and outputs $D*Z_1$ (which is $2A*Z_1=2Y_1*Z_1$) on line 650 to register memory 695 where it is stored in $Z_3$.

Step 311 is performed using the microprocessor and returns the result of PDBL algorithm 300 which is ($X_3$, $Y_3$, $Z_3$) for input ($X_1$, $Y_1$, $Z_1$).

The invention claimed is:

1. A data cryptographic apparatus comprising:
a computational logic configured to perform an elliptic curve cryptography (ECC) point doubling operation using Jacobian coordinates over a short Weierstrass curve of the form $y=x^3+ax+b$ where $a=-3$;
a register memory configured to store a point in the Jacobian coordinates, wherein the register memory is configured for no more than one temporary storage variable, α;
a modular multiplier electrically coupled to the register memory, wherein the modular multiplier is configured to perform at most one modular multiplication for each step in a sequence of steps in the ECC point doubling operation; and
a simple arithmetic processor configured to perform modular subtraction, modular addition, and modular multiplication by two in support of the ECC point doubling operation utilizing a logical one bit left shifter, a logical two bit left shifter, a logical three bit left shifter, and a multiplier by three constructed using a logical one bit left shifter and an adder configured to output either A+B, A−8B, 2A, 3(A−B), or 4A−B for an input of variables A and B, wherein the simple arithmetic processor is electrically coupled to the register memory, the computational logic and the modular multiplier, to output the result of the ECC point doubling operation in the Jacobian coordinates.

2. A mobile device comprising the apparatus of claim 1.

3. A smartcard comprising the apparatus of claim 1.

4. The mobile device of claim 2, wherein the mobile device is a smartphone.

5. A method for performing an elliptic curve cryptography (ECC) point doubling operation using Jacobian coordinates over a short Weierstrass curve of the form $y=x^3+ax+b$ where $a=-3$, comprising:
accepting, by a computational device, as variable input, a point in the Jacobian coordinates using a simple arithmetic processor;
configuring the simple arithmetic processor of the computational device for modular subtraction, modular addition, modular multiplication by two and modular multiplication by three utilizing a logical one bit left shifter, a logical two bit left shifter, a logical three bit left shifter, and a multiplier by three constructed using a logical one bit left shifter and an adder, wherein an input of variables A and B to the simple arithmetic processor results in an output of either A+B, A−8B, 2A, 3(A−B), or 4A−B;
enabling, a modular multiplier of the computational device to execute a sequence of steps to perform the ECC point doubling operation of the point in the Jacobian coordinates, wherein the modular multiplier performs at most one modular multiplication for each step in the sequence of steps, wherein the sequence of steps requires no more than one temporary variable; and outputting, by the computational device, a result of the ECC point doubling operation in the Jacobian coordinates.

6. The method of claim 5, wherein the computational device is part of a mobile device.

7. The method of claim 6, wherein the mobile device is a smartphone.

8. The method of claim 5, wherein the computational device is part of a smartcard.

* * * * *